United States Patent [19]
Suchman

[11] Patent Number: 5,557,584
[45] Date of Patent: Sep. 17, 1996

[54] MODERATE DEPTH UNDERWATER SURVEILLANCE SYSTEM

[75] Inventor: Daniel Suchman, Goleta, Calif.

[73] Assignee: Sonatech, Inc., Santa Barbara, Calif.

[21] Appl. No.: 512,529

[22] Filed: Aug. 8, 1995

[51] Int. Cl.$^6$ .................................................. H04B 11/00
[52] U.S. Cl. ............................................. 367/131; 367/910
[58] Field of Search ................................. 367/87, 107, 115, 367/131, 910; 441/2, 11, 1

[56] References Cited

U.S. PATENT DOCUMENTS

| | | | |
|---|---|---|---|
| 4,126,847 | 11/1978 | Etkins | 367/131 |
| 4,188,542 | 2/1980 | Hogg et al. | |
| 4,437,055 | 3/1984 | Meyer . | |
| 4,575,786 | 3/1986 | Roberts . | |
| 4,810,951 | 3/1989 | Meyer . | |
| 4,816,694 | 3/1989 | Kuppenheimer, Jr. et al. . | |
| 4,845,855 | 7/1989 | Meyer . | |
| 5,449,307 | 9/1995 | Fuereder | 441/2 |

*Primary Examiner*—Ian J. Lobo
*Attorney, Agent, or Firm*—Nydegger & Associates

[57] ABSTRACT

A system of sonar platforms designed for use in moderate depth water is disclosed, with each platform having a plurality of transducer modules mounted thereon. Each transducer module has a plurality of sonar transducers mounted in columns. The transducers are electronically grouped in two groups for sensing of reflected signals, to provide a means of bearing calculation by the phase monopulse method. The transducer modules are identical and interchangeable, so that any module can be mounted in any position on any platform. Each platform is hexagonal, with up to six transducer modules mountable on each platform to provide the desired pattern of sonar coverage for the platform. The platforms can be arranged in any desired pattern to provide the desired sonar coverage of a particular body of water.

21 Claims, 3 Drawing Sheets

MODERATE DEPTH UNDERWATER SURVEILLANCE SYSTEM

FIELD OF INVENTION

The present invention is in the field of systems for detection of objects in a body of water, through the use of active sonar. Specifically, the present invention is in the field of sonar arrays assembled to cover a selected body of water.

BACKGROUND OF THE INVENTION

It is often desirable to be able to detect the presence and location of small vessels on or in a body of water, for the purpose of protecting a harbor or other such facility, or for other purposes. In the vicinity of a typical harbor there is often an area of water having a moderate depth, in the range of one hundred to four hundred feet deep. This moderate depth water is often located in a strait, at the perimeter of, or just outside the harbor.

In order to protect such an area, the area of moderate depth water should be scanned by a detection system which can cover the area from essentially the surface of the water to the bottom. An irregular bottom should also be taken into consideration. Typically, such a body of water will lend itself to being divided into sectors. With currently known systems, it can be difficult to deploy a detection system specifically designed for the particular bottom contours and depths encountered. This often calls for specific engineering solutions to the various detection problems encountered. The configuration of the harbor drives the design of the sonar system. The systems thusly designed are usually unsuitable for other bodies of water and other harbors.

A fixed system can sometimes cost too much to be justified for a given harbor, if the threat is low, or if the amount of shipping does not justify the expense. However, even in such a low risk harbor, a period of heightened tension can give rise to the need to provide protective surveillance in a short period of time. Further, even for a given harbor, the risk against which protection is sought can change quickly. The reason for the change sometimes involves smaller or larger vessels than originally foreseen, or changing from a surface threat to a submarine threat. The risks can also change quickly if the number or types of ships in the harbor change materially. This can call for the temporary but rapid extension of the coverage of an existing system. It is often necessary to respond quickly to such changes in the risk scenario by installing or modifying a sonar system.

The ability to rapidly assemble a detection system and put it into operation can also be useful when a permanently installed detection system must be taken out of service temporarily for repairs. It can be beneficial to assemble a temporary system from modular components for use during repair of the permanent system. Finally, known systems are sometimes difficult to maintain because of their specialized design. Marine life can foul the equipment used, and the necessary removal, cleaning, and reinstallation of components can require significant down time. For this reason, modularity of the components of a sonar system could facilitate the maintenance of the system.

In light of the above, it is an object of the present invention to provide a modular system of active sonar platforms which can be quickly and easily configured to respond to a given risk scenario in a variety of depths and bottom contours by arranging a plurality of the platforms in any desired pattern. It is a further object of the present invention to provide a modular system of active sonar platforms, with each platform utilizing a plurality of modular transducer arrays which can be moved from one platform to another and from one position on the platform to another. It is a yet further object of the present invention to provide a surveillance system that is rapidly deployable, recoverable, and battery powered, with either a fiber optic link or a radio frequency link to a shore station. It is a still further object of the present invention to provide a modular surveillance system which is adaptable to changes in acoustic propagation conditions. Finally, it is an object of the present invention to provide a modular system of active sonar platforms which is easy and economical to assemble and operate.

SUMMARY OF THE INVENTION

The present invention is a surveillance system based upon a plurality of hexagonal platforms which can be arranged in any desired pattern to provide surveillance of any particular body of water. The platform could also have other shapes. The pattern of platforms is electronically connected together and connected to a shore station which operates and monitors the platforms. The communication link between the platforms and the shore station can be by a radio frequency link or by a fiber optic link.

Each platform has a plurality of transducer modules installed thereon. Each module can be installed on any of the six sides of the platform, up to a maximum of six transducer modules per platform. Each module can be designed to have a selected horizontal beam width and a selected vertical beam width. Where the platforms are hexagonal, the horizontal beam width should be sixty degrees, for instance, to provide full circle coverage with six modules. A typical vertical beam width is about twenty degrees, to insure adequate vertical coverage. The platforms are designed for installation on the bottom of the body of water, and the modules are angled slightly upwardly. A typical vertical angle of orientation of the module is between zero and fifteen degrees.

A platform can, for example, have two transducer modules, mounted on opposite sides of the platform. A plurality of thusly configured platforms can be strung together in a chain, with the transducer modules on each platform facing the neighboring platforms. This can provide a continuous chain or barrier of sonar protection, which can be strung from shoreline to shoreline across the access routes to a harbor entrance. Alternatively, a platform can have a transducer module installed on each of its six sides, to provide a continuous circle of sonar coverage. A plurality of such platforms can then be placed throughout the area to be protected, in a pattern providing complete coverage of the area or of selected parts of the area, such as harbor entrances or straits.

All of the transducer modules used at a given installation are identical and interchangeable, so that any given module can be installed on any given side of any given platform. Further, any given module can be removed from its platform and replaced by any other module. This modularity facilitates quick maintenance and repair of the system. It also enables custom design of a system to suit a particular body of water and a particular risk scenario.

Each module has a plurality of identical sonar transducers mounted on its face. The transducers are oriented so as to provide the desired horizontal and vertical beam widths for the module. The transducers can be arranged in a series of vertical columns, with a given number of transducers in each column. Other patterns could also be used. The columns of transducers can be selectively grouped electronically into two groups for a given module. The two groups of columns can have a number of columns in common.

All transducers on the module can be simultaneously pulsed to transmit a sonar signal. A signal reflected by the target or intruder is then received by the transducers, with the time of reception by different transducers varying according to the relative angular orientation between the face of the module and the target. The difference between reception times of the first group of columns and the second group of columns can then be measured and translated into a difference in path length of the received signal. The path length difference for a known wavelength signal is then translated into a phase difference between received signals, and ultimately into an azimuth angle of the target object relative to the face of the module. A compass on the platform can provide an earth reference to determine the absolute azimuth angle of the target object. This is known as the phase monopulse technique of bearing calculation.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF PREFERRED EMBODIMENTS

Figure 1:
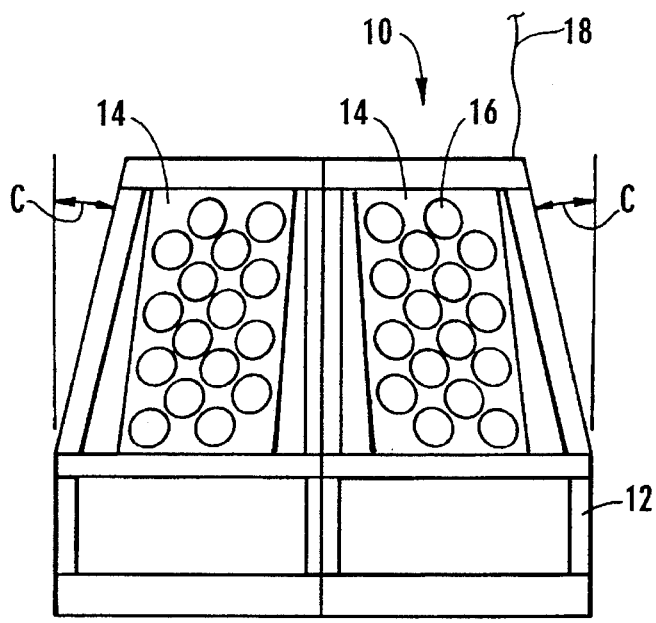
FIG. 1 is an elevation view of a possible configuration of the sonar platform of the present invention.
Figure 2:
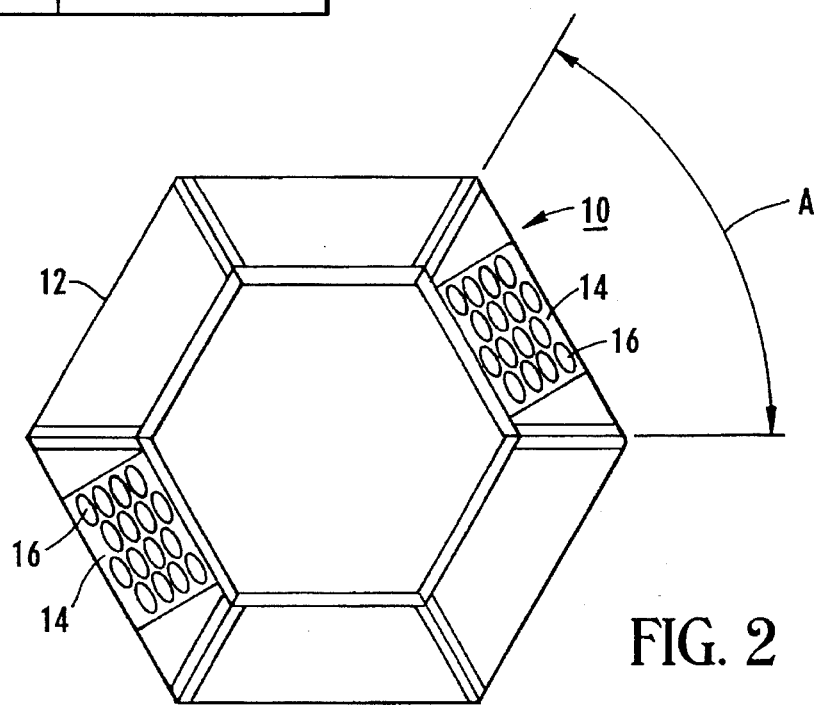
FIG. 2 is a plan view of a second configuration of the platform of the present invention, shown with two transducer modules installed.

As shown in FIG. 1, a platform 10 of the present invention is constructed of a platform frame 12, having one or more transducer modules 14 mounted thereon. The platform frame 12 is typically placed on the bottom in water from one hundred to four hundred feet deep. A system having greater or lesser depth capabilities could be constructed without departing from the present invention. The configuration of the frame 12 shown is for exemplary purposes only. The exact configuration of the frame 12 is not critical to the present invention. The frame 12 would be designed according to known marine design principles to suit the bottom on which the platform 10 would be situated. Each transducer module 14 has sixteen identical sonar transducers 16 mounted thereon. FIG. 2 shows that, in any case, the preferred embodiment of the platform 10 is constructed in the shape of a hexagon. Another shape, such as an octagonal shape, could easily be used without departing from the present invention. The transducer modules 14 are mountable on the upper sides of the frame 12, up to a maximum of six modules 14 on one platform 10. Eight modules 14 could be used on an octagonal platform. Each platform 10 has a fiber optic cable 18 or a radio frequency link. A power cable (not shown) can run along with the fiber optic cable 18 if required to provide power to the platform 10. If a fiber optic link is used, the optical fiber is connected to any other platforms 10 being used, and to a shore station which controls and monitors the platforms 10. If a radio frequency link is used, the cable 18 is replaced by an antenna. The antenna can be mounted on a surface buoy. Each platform 10 can be battery powered, or powered from the shore station.

Figure 3:
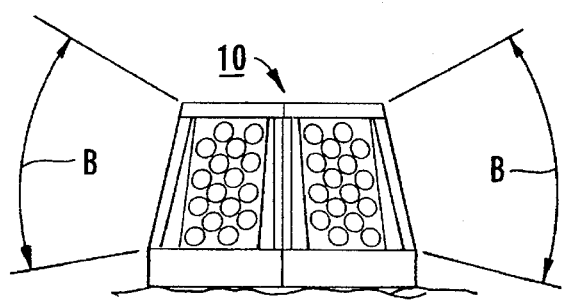
FIG. 3 is an elevation view of the platform shown in FIG. 1, showing the vertical beam width.

As shown in FIG. 2, each side of the platform 10 faces a sixty degree sector, and each module 14 transmits and receives sonar signals with a horizontal beam width A covering a sixty degree angle. A module 14 for use on an octagonal platform would be designed to cover a forty-five degree angle. Each module 14 has a twenty degree vertical beam width B as shown in FIG. 3. The upper sides of the frame 12, and therefore the modules 14, are angled upwardly at approximately a fifteen degree angle C. The platform frame 12 is constructed so as to hold the modules 14 one or two meters above the bottom.

Figure 4:
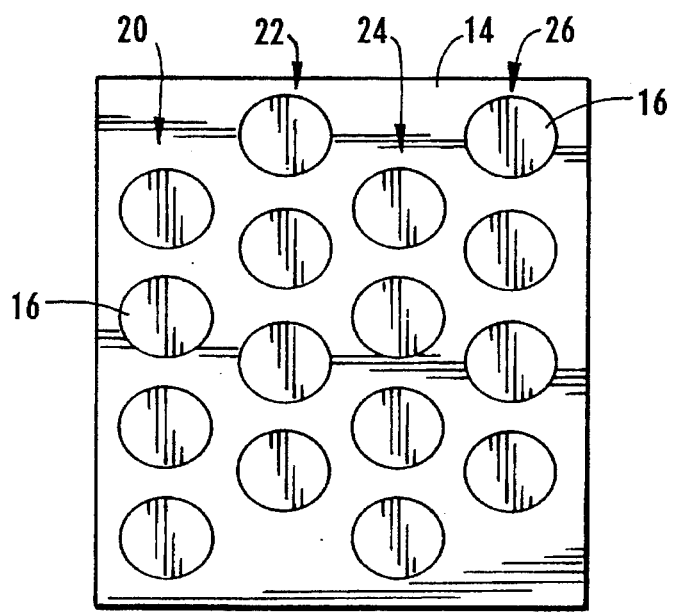
FIG. 4 is an elevation view of the transducer module used in the present invention.

FIG. 4 shows a view of a typical module 14, with sixteen sonar transducers 16 arranged in an array of four vertical columns or sets 20, 22, 24, 26 of four transducers 16 each. Each column or set 20, 22, 24, 26 of transducers 16 is also referred to as a stave. The four staves 20, 22, 24, 26 are electronically grouped into two sub-arrays, with each sub-array including three of the staves. For instance, the first sub-array or group might contain staves 20, 22, and 24, while the second sub-array or group might contain staves 22, 24, and 26. Two of the staves 22, 24 are included in both sub-arrays.

The transducers 16 are pulsed to transmit a sonar beam with a frequency between approximately 20 kHz and 30 kHz, according to methods well known in the art. Signals reflected by objects in the water, within the beam width covered by the module 14, are received by the transducers 16. The reflected signals cause the transducers 16 to put out electrical signals which can be sensed and used to calculate the range and bearing of the object detected. The transducers 16 on adjacent or overlapping modules 14 could use different frequencies or different pulse shapes to reduce interference between adjacent modules. This could allow for more rapid pulsing and faster revision of information.

All transducers 16 on a given module 14 are pulsed simultaneously to transmit a sixty degree wide, twenty degree high beam. A detected object reflects the signal back to the transducers 16. The time between pulse transmission and receipt of the reflected signal is used to calculate the range of the object, for a known velocity of sound in water. The reflected signal received by the first sub-array is compared with the reflected signal received by the second sub-array to calculate the bearing of the object by a method known in the art as the phase monopulse technique.

In this method, the reflected signal received by two transducers arrives at one transducer before the other, if the object is not straight ahead of the transducers. The difference in travel times is translated into a signal path length difference, and a phase difference, for a known velocity in water and a known wavelength. Then, the phase difference is translated into a bearing angle of the object relative to the orientation of the transducers, for a known separation between transducers.

This same principle is used to calculate the bearing angle of the object by sensing the average time of receipt of the reflected signal by the first sub-array of transducers and by the second sub-array of transducers. The time difference between these two average times is then used as discussed above to calculate the bearing angle of the object. A compass can be mounted on the platform 10 to give an earth reference to aid in calculating the azimuth angle of the object from the platform 10. A plurality of transducers 16 are used in each sub-array, rather than a single transducer, to provide the desired beam widths and time delay versus bearing angle. The pulsing of the transducers 16, the receipt of signals from the transducers 16, and the calculation of range and bearing are performed by the shore station.

Figure 5:
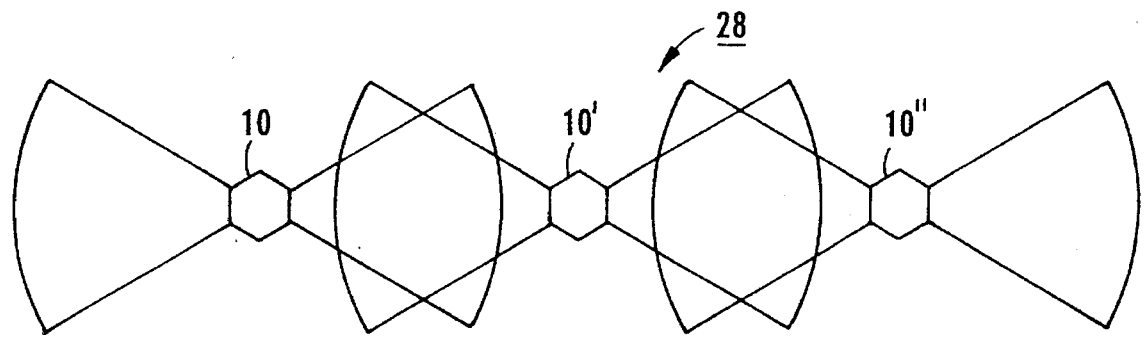
FIG. 5 is a schematic of a chain configuration of sonar platforms.

The primary advantage of the present invention lies in the modularity of the equipment, which allows the invention to be quickly and efficiently deployed in a any desired configuration to efficiently monitor any possible location. For instance, FIG. 5 shows a chain 28 of platforms 10, 10', 10". Such a configuration might be used to monitor a harbor entrance or a strait, with the chain 28 stretching across the body of water from shore to shore. Each platform 10, 10', 10" can have two modules 14 installed thereon, mounted on opposite sides of the platform. Such a platform is shown in FIG. 2. Each of the platforms 10, 10', 10" is placed with its modules 14 facing the neighboring platforms in the chain 28. This allows continuous coverage of the body of water, in a sense forming a sonar barrier, if the platforms are placed sufficiently close to each other to eliminate dead spaces above the platforms. Any vessel or other object would have to pass through the surveilled area to enter the harbor or pass through the strait. The chain can be automatically energized by means of gaussian loops laid on the bottom. As a vessel passes over the gaussian loop, the distortion it causes in the earth's magnetic field will be sensed, and a signal will be sent to energize the chain from the shore station.

Figure 6:
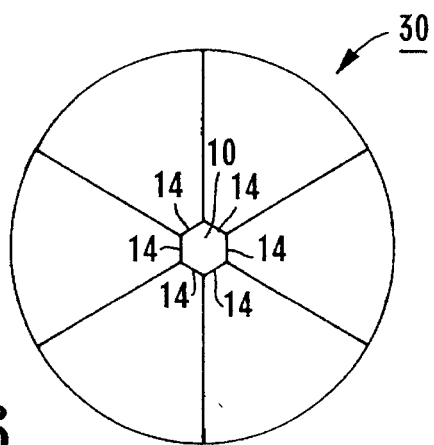
FIG. 6 is a schematic of an area configuration of a sonar platform.

FIG. 6 shows another configuration of the platform 10, with a module 14 installed on every side of the frame 12. This circle configuration 30 provides a continuous circle of sonar coverage outwardly from the point at which the twenty degree vertical beam strikes the surface of the water. No vessel can pass through the area without breaking the perimeter of the circle of coverage provided. Platforms thusly configured can be placed in any pattern desired to detect any threat anticipated. Coverage of a large area can be achieved in this way.

Figure 7:
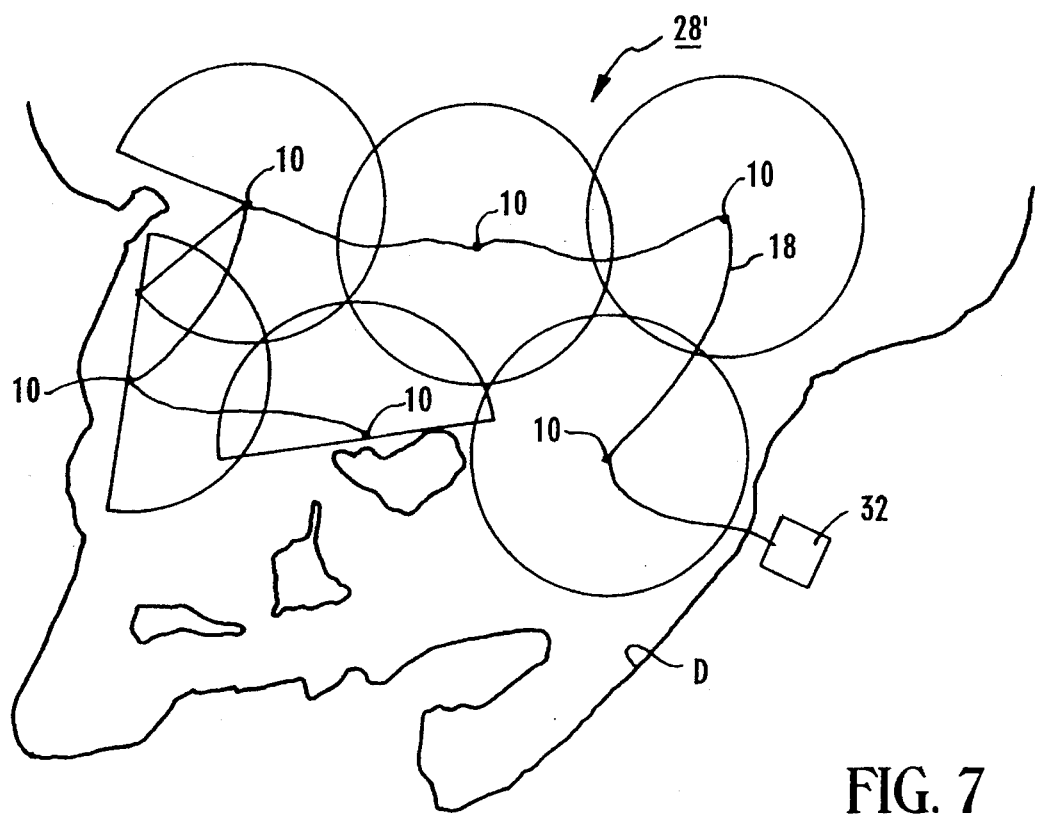
FIG. 7 is a plan view of a harbor protected by a suggested configuration of sonar platforms according to the present invention.

Obviously, the various sides of a platform 10 can have sonar modules 14 installed in different combinations, to cover selected angles in multiples of 60 degrees. FIG. 7 shows a typical harbor with shoreline D. A chain 28' of platforms 10 are connected by fiber optic cable 18 to each other and to a shore station 32. Each platform 10 is configured to cover the required sector of the harbor. Three of the platforms are configured to cover 360 degrees, two are configured for 180 degrees, and one is configured to cover 300 degrees, encompassing a small peninsula.

Figure 8:
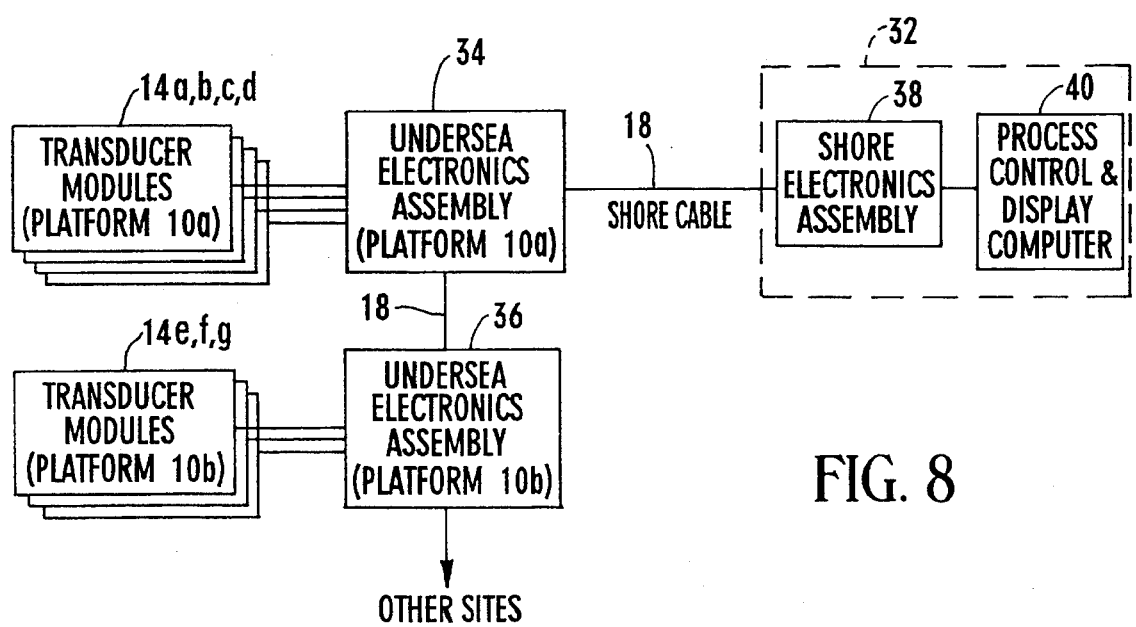
FIG. 8 is a block diagram of a typical system of sonar platforms according to the present invention.

FIG. 8 shows a high level block diagram of a system of transducer modules 14 and platforms 10, illustrating the functional connection to the shore station. The platforms in this diagram are designated platforms 10a and 10b. Four transducer modules 14a, 14b, 14c, 14d are shown on platform 10a. These four modules are electrically connected to a first undersea electronics assembly 34 on platform 10a. Similarly, three transducer modules 14e, 14f, 14g are connected to a second undersea electronics assembly 36 on platform 10b. The first and second undersea electronics assemblies 34, 36, as well as any electronics assemblies on other platforms, are connected via the fiber optic cable 18 to a shore electronics assembly 38 in the shore station 32. Each electronics assembly also serves as a bi-directional repeater transmitting commands from the shore to other sonar platforms farther from shore, and transmitting data from those platforms to the shore. A process control and display computer 40 in the shore station 32 is connected to the shore electronics assembly 38 for control of the sonar transducers 16, for gathering of data, and for display of information for the operator. As mentioned previously, a radio link could be used instead of the fiber optic cable 18.

While the particular MODERATE DEPTH UNDERWATER SURVEILLANCE SYSTEM as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

I claim:

1. An active sonar system having a plurality of detection sites selectively positioned on the seafloor for the detection of submerged objects in moderate depth waters, each site comprising:

a support platform;

a first sub-array, said first sub-array being mounted on said platform and including a plurality of transducers for transmitting and receiving acoustic signals;

a second sub-array, said second sub-array being mounted on said platform and including a plurality of transducers for transmitting and receiving acoustic signals;

means for activating said first and said second sub-arrays to transmit an acoustic signal along a predetermined path;

means for generating a site report by comparing echos of said transmitted acoustic signal from said submerged object received at said first sub-array with echos of said transmitted acoustic signal from said submerged object received at said second sub-array, said report including a range and a bearing of said submerged object from said site; and means for verifying said site report with reports from other said sites in said system.

2. A system as recited in claim 1 wherein said first sub-array and said second sub-array are joined together in a modular assembly, with said transducers of said first sub-array and said second sub-array grouped into a first stave, a second stave, a third stave, and a fourth stave, and wherein said first sub-array comprises said first stave, said second stave and said third stave, and said second sub-array comprises said second stave, said third stave and said fourth stave.

3. A system as recited in claim 2 wherein said site comprises a plurality of said modular assemblies with each said modular assembly being mounted on said platform to surveil a predetermined sector.

4. A system as recited in claim 3 wherein each said modular assembly transmits a respective acoustic signal into said sector through an arc of approximately sixty degrees.

5. A system as recited in claim 4 wherein said platform has a hexagonal configuration to selectively accommodate up to six of said modular assemblies for establishing a plurality of contiguous sixty degree sectors for a total coverage of up to three hundred and sixty degrees.

6. A system as recited in claim 5 further comprising an alarm for indicating the presence of said submerged object in said sector.

7. A system as recited in claim 1 wherein said acoustic signal has a frequency in the range of twenty to thirty kHz.

8. A system as recited in claim 1, further comprising computer means for varying the frequencies of acoustic signals transmitted by said transducers on adjacent modules to prevent interference.

9. A system as recited in claim 1 wherein said site is deployed at water depths in the range between one hundred and four hundred feet.

10. A system as recited in claim 1 further comprising a compass mounted on said modular assembly for providing an earth coordinate reference.

11. An apparatus for detecting the location of an object in water, said apparatus comprising:

a platform;

a plurality of transducer modules mounted on said platform;

a plurality of sonar transducers mounted on each of said transducer modules;

means for electronically grouping each said plurality of sonar transducers on each said transducer module into a first group of said transducers and a second group of said transducers, said first group and said second group having selected transducers in common;

means for simultaneously pulsing said plurality of transducers on a selected one of said transducer modules to transmit a sonar signal beam having a selected horizontal beam width and a selected vertical beam width;

means for sensing an output signal from each of said transducers in response to receipt by each of said transducers of a sonar signal reflected by the object; and means for measuring a time difference between receipt of said reflected signal by said first group of transducers and said second group of transducers, and for calculating an azimuth angle of the object relative to said transducer module, based upon said time difference;

wherein each said transducer module is oriented at a selected azimuth angle and a selected vertical angle to provide aggregate coverage of a selected region of water by said plurality of transducer modules.

12. An apparatus for detecting the location of an object in water, as recited in claim 11, wherein said transducer modules are identical and interchangeable with each other.

13. An apparatus for detecting the location of an object in water, as recited in claim 11, further comprising:

a plurality of said platforms arranged in a pattern designed to provide a continuous barrier of sonar coverage in a selected body of water;

a plurality of transducer modules mounted on each of said platforms;

a plurality of sonar transducers mounted on each of said transducer modules; and means for communicatively connecting said plurality of platforms with a control station for monitoring and control of said barrier of sonar coverage.

14. An apparatus for detecting the location of an object in water, as recited in claim 13, wherein:

said pattern of said platforms comprises a chain; and each said platform in said chain has a transducer module oriented toward each neighboring said platform in said chain to insure detection of the object as the object passes said chain.

15. An apparatus for detecting the location of an object in water, as recited in claim 13, wherein said communicative connecting means comprises a fiber optic link.

16. An apparatus for detecting the location of an object in water, as recited in claim 13, wherein said communicative connecting means comprises a radio frequency link.

17. An apparatus for detecting the location of an object in water, as recited in claim 11, wherein:

said platform is hexagonal shaped; and each said transducer module is mountable on one of the six sides of said platform, up to six of said transducer modules being mountable on said platform.

18. An apparatus for detecting the location of an object in water, as recited in claim 11, wherein:

said plurality of sonar transducers mounted on each of said transducer modules are arranged in a plurality of physical sets of said transducers;

said first group of said transducers includes a first plurality of said sets;

said second group of said transducers includes a second plurality of said sets; and said first plurality of sets and said second plurality of sets have selected sets in common.

19. An apparatus for detecting the location of an object in water, as recited in claim 18, wherein:

said plurality of sonar transducers mounted on each of said transducer modules are arranged in four of said physical sets of said transducers;

each said set includes four of said transducers;

said first group of said transducers includes three of said sets;

said second group of said transducers includes three of said sets; and said first group and said second group have two sets in common.

20. An apparatus for detecting the location of an object in water, as recited in claim 19, wherein said four transducers in each said physical set are arranged in a vertical column.

21. An apparatus for detecting the location of an object in water, as recited in claim 11, wherein:

said selected horizontal beam width is about sixty degrees;

said selected vertical beam width is about twenty degrees; and said selected vertical angle is between zero and fifteen degrees.

* * * * *